(12) United States Patent
Dugan et al.

(10) Patent No.: US 11,976,215 B2
(45) Date of Patent: *May 7, 2024

(54) SCUFF RESISTANT AND CHIP RESISTANT ARCHITECTURAL COMPOSITIONS

(71) Applicant: Columbia Insurance Company, Omaha, NE (US)

(72) Inventors: Jonathan Dugan, Washington, NJ (US); Ashlee Agens, Hackettstown, NJ (US); Ed Ament, Little Falls, NJ (US); Glenn Cooper, East Hanover, NJ (US); Johanna Garcia, Lake Hopatcong, NJ (US); Jeff Hood, Hampton, NJ (US); Kevin Lee, North Brunswick, NJ (US); Kate O'Connor, Tannersville, PA (US); Rogina Saad, Ottsville, PA (US); Marie Saturne, Orange, NJ (US); Jeffrey T. Spillane, Paramus, NJ (US)

(73) Assignee: Columbia Insurance Company, Omaha, NE (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/579,714

(22) Filed: Jan. 20, 2022

(65) Prior Publication Data
US 2022/0135808 A1 May 5, 2022

Related U.S. Application Data

(63) Continuation of application No. 16/097,974, filed as application No. PCT/US2017/031287 on May 5, 2017, now Pat. No. 11,230,645.
(Continued)

(51) Int. Cl.
*C09D 5/00* (2006.01)
*C09D 5/02* (2006.01)
*C09D 7/41* (2018.01)
*C09D 133/00* (2006.01)
*C09D 175/04* (2006.01)
(Continued)

(52) U.S. Cl.
CPC ............ *C09D 5/028* (2013.01); *C09D 5/02* (2013.01); *C09D 7/41* (2018.01); *C09D 133/00* (2013.01); *C09D 175/04* (2013.01); *C09D 191/00* (2013.01); *C09D 191/06* (2013.01);
(Continued)

(58) Field of Classification Search
None
See application file for complete search history.

(56) References Cited

U.S. PATENT DOCUMENTS 11,230,645 B2 * 1/2022 Dugan ............... C09D 5/02
2007/0060669 A1 * 3/2007 Yoda ................. C09D 11/03
523/160
(Continued)

*Primary Examiner* — Stefanie J Cohen
(74) *Attorney, Agent, or Firm* — The H.T. Than Law Group

(57) ABSTRACT

Solutions to the problems of scuffing and chipping of the paint films in high traffic areas and in tight spaces, such as dressing rooms in department stores, where multiple scrapings of the wall paints are created by consumers, clothes hangers, shoes, etc., and hallways and conference rooms in office and other commercial buildings are disclosed. Wax seeded latex polymers admixed with an added wax in architectural compositions and optionally with polyurethane resin are utilized to create paint films that are resistant to scuffing and chipping.

16 Claims, 4 Drawing Sheets

Related U.S. Application Data

(60) Provisional application No. 62/332,907, filed on May 6, 2016.

(51) Int. Cl.
*C09D 191/00* (2006.01)
*C09D 191/06* (2006.01)
*C08L 33/00* (2006.01)
*C08L 91/08* (2006.01)

(52) U.S. Cl.
CPC ............... *C08L 33/00* (2013.01); *C08L 91/08* (2013.01); *C08L 2205/22* (2013.01)

(56) References Cited

U.S. PATENT DOCUMENTS

| | | | |
|---|---|---|---|
| 2009/0004468 A1* | 1/2009 | Chen | C04B 41/483 524/451 |
| 2013/0079456 A1* | 3/2013 | Yang | C08F 220/14 524/506 |
| 2013/0123426 A1* | 5/2013 | Clarke | C09D 11/102 524/871 |

* cited by examiner

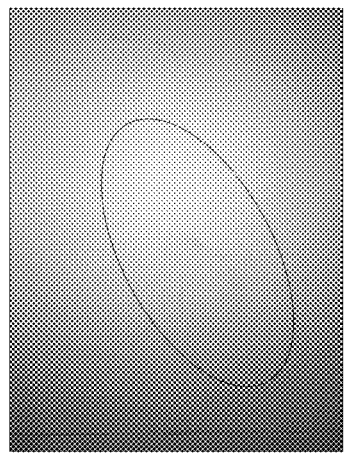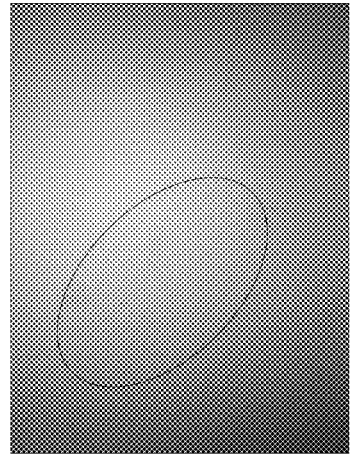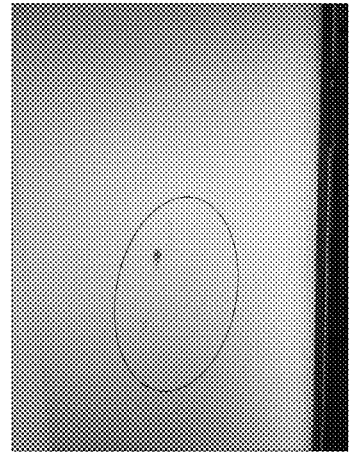
FIGURES 3A, 3B, 3C
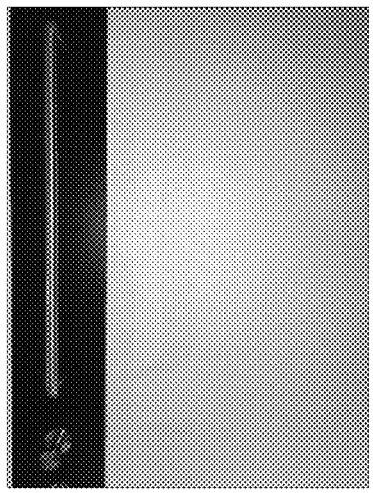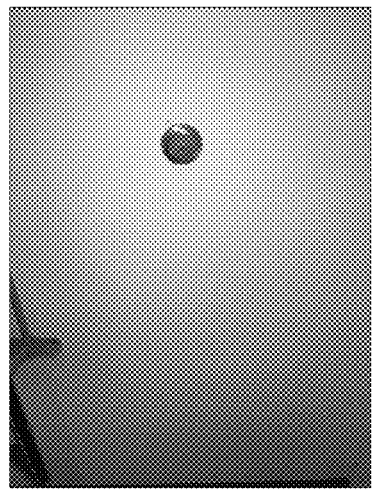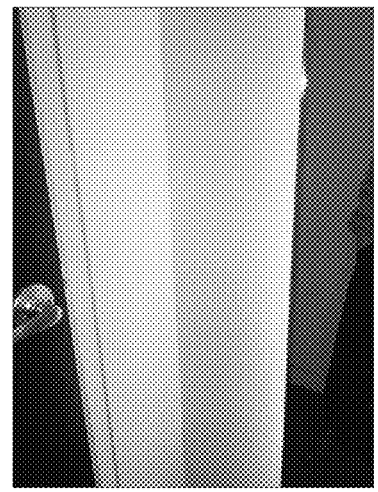
FIGURES 4A, 4B, 4C

SCUFF RESISTANT AND CHIP RESISTANT ARCHITECTURAL COMPOSITIONS

The present application is a continuation application and claims the benefit of priority under 35 U.S.C. § 120 of U.S. Ser. No. 16/097,974, now U.S. Pat. No. 11,230,645, filed on Oct. 31, 2018, which claims priority to international patent application number PCT/US2017/031287, filed on May 5, 2027, which claims benefit of provisional application number 62/332,907 entitled, filed on May 6, 2016. All priority patent applications are incorporated herein by reference in their entireties.

FIELD OF THE INVENTION

This invention generally relates to paints and stains that are resistant to scuffing and/or chipping and more specifically the present invention relates to paints and stains designed for high traffic area walls.

BACKGROUND OF THE INVENTION

Walls in high traffic areas or in tight spaces, such as dressing rooms or hall ways, are often contacted or rubbed by people or objects, such as coat hangers, shoes or furniture during office moves. These objects may leave scuff marks on the walls either by removing a layer of paint or by leaving a residue on the paint surface. Attempts to minimize scuff marks have not been fully satisfactory, and walls in high traffic areas needed to be repainted regularly.

U.S. Pat. No. 5,959,020 to Oliveri et al. teaches a UV curable composition comprising a wax, a radiation-polymerizable compound and at least one inhibitor that prevents polymerization in situ. This wax is dissolved with the radiation-polymerizable compound and inhibitor, is cooled and then micronized into fine particles. These fine particles are then mixed with a paint, varnish or ink, which are UV curable. This reference discloses one UV cured sample that exhibits some scuff resistance.

U.S. Pat. No. 6,033,736 to Pearlman and Black teaches an aqueous wax emulsion that is applied onto an old paint surface, a fresh paint surface or any unpainted surface to be a paint primer, so that another coating can be applied on top thereof. The aqueous wax emulsion dries to become a continuous wax coating that can be removed by hot pressurized water to also remove the top coating. The aqueous wax emulsion generally comprises an ethylene wax, an emulsifier and water.

Waxes have also been incorporated heretofore into thermoplastics prior to the molding process to change one or more properties of the molding process and/or the molded parts. U.S. Pat. No. 5,962,573 to Berta teaches adding certain oxidized polyethylene waxes to a thermoplastic polyolefin composition so that the molded parts have improved adhesion to paints. U.S. Pat. No. 7,291,676 to Berta teaches adding specific oxidized polyethylene waxes to a heteroplasic polyolefin to achieve a good balance between abrasion resistance and softness for the molded parts.

Conventional scuff resistant paints are typically two-part compositions that require consumers to mix the two separate components together before applying them to substrates. However, there remains a need for anti-scuff and/or an anti-chip architectural coatings or paints that can be cured by evaporation in air and don't require mixing of components.

SUMMARY OF THE INVENTION

The present invention is directed to paint compositions that comprise a wax seeded latex resin and a wax powder and/or a wax emulsion, as well as other additives. The inventive paint compositions form paint films by evaporation can resist scuff marks and chipping. Preferably the inventive paint composition is a single-component paint, i.e., it is not necessary to mix two or more components before the paint is ready to use.

In one embodiment, the present invention relates to an architectural aqueous coating composition that forms a paint film, said paint film is capable of resisting scuffing or chipping, wherein the architectural aqueous coating composition comprises a wax seeded latex, wherein the wax seeded latex comprises a hydrophobic wax compound entrapped within a polymeric matrix, and an added wax wherein the added wax makes up from 1.04 wt. % to 4.77 wt. % of the architectural aqueous coating composition.

The architectural aqueous coating composition may further comprise an opacifying pigment, wherein a range of opacifying pigment to wax weight ratios is from 5.6 to 8. The architectural aqueous coating composition may further comprise a coalescent aid, wherein a range of wax seeded latex to coalescent aid weight ratios is from 14.7 to 16.15. The architectural aqueous coating composition may further comprise a polyurethane resin, wherein a range of weight ratios of wax seeded latex to polyurethane resin is about 2.17±10%, preferably ±5%, more preferably ±2.5%. The architectural aqueous coating composition may further comprise a polymeric synthetic pigment, wherein a range of weight ratios of wax seeded latex to polymeric synthetic pigment is about 12.11±10%, preferably ±5%, more preferably 2.5%.

In another embodiment, the present invention is directed to an architectural aqueous coating composition that forms a paint film, said paint film is capable of resisting scuffing or chipping, wherein the architectural aqueous coating composition comprises a wax seeded latex, wherein the wax seeded latex comprises a hydrophobic wax compound entrapped within a polymeric matrix, an optional opacifying pigment and an added wax, wherein the added wax makes up from about 2.0 wt. % to about 12.0 wt. % of the architectural aqueous coating composition.

The wax may preferably make up from about 3.0 wt. % to 10.0 wt. % of the architectural aqueous coating composition, or from about 3.0 wt. % to 7.0 wt. % of the architectural aqueous coating composition.

The architectural aqueous coating composition may further comprise the opacifying pigment and wherein a range of opacifying pigment to wax weight ratios less than about 8.0, or the range of opacifying pigment to wax weight ratios less than about 6.0. The range of wax seeded latex to coalescent aid weight ratios is from about 15 to about 35. The architectural aqueous coating composition may further comprise a polyurethane resin, wherein a range of wax seeded latex to polyurethane resin weight ratios is from about 1.0 to about 2.5, or from about 1.25 to about 2.25.

In yet another embodiment, the present invention relates to an architectural aqueous coating composition that forms a paint film, said paint film is capable of resisting scuffing or chipping, wherein the architectural aqueous coating composition comprises a wax seeded latex, an optional opacifying pigment, a wax and a coalescent aid. The wax seeded latex comprises a hydrophobic, wax compound entrapped within a polymeric matrix, and the wax makes up from about 0.25 wt. % to about 2.0 wt. % of the architectural aqueous coating composition. Preferably, the coalescent aid makes up from about 2.5 wt. % to about 5 wt. % of the architectural aqueous coating composition.

The wax may make up less than about 1.75 wt. %, preferably less than about 1.5 wt. % or 1.25 wt. % or less than about 1.0 wt. % or about 0.5 wt. % of the architectural aqueous coating composition. The coalescent aid may make up at least about 2.8 wt. %, preferably at least about 3.0 wt. %, preferably at least about 3.5 wt. % of the architectural aqueous coating composition.

In all embodiments, the wax may include a HDPE oxidized powder, having an average particle sizes (mV) from about 1 microns (μm) to about 25 μm, preferably about 3 μm to about 22 μm, preferably about 5 μm to about 20 μm. The wax may comprise a dispersion of HDPE wax in water or another solvent. The wax seeded latex may comprise a wax center having a molecular weight (Mn or Mw) from about 200 to about 1000, and optionally an acrylic matrix polymer. In all embodiments the architectural aqueous coating composition may comprise a color pigment(s) or a colorant(s).

In all embodiments, the present invention relates to architectural aqueous coating compositions that form paint films by coalescence through evaporation and the paint films are capable of resisting scuffing or chipping.

BRIEF DESCRIPTION OF THE DRAWINGS

In the accompanying drawings, which form a part of the specification and are to be read in conjunction therewith and in which like reference numerals are used to indicate like parts in the various views:

FIGS. 3A-3C are photographs of scuff and stain marks on walls painted with conventional paints;

FIGS. 4A-4C are photographs of walls painted with the inventive paint; and

DETAILED DESCRIPTION OF THE PREFERRED EMBODIMENTS

Figure 1:
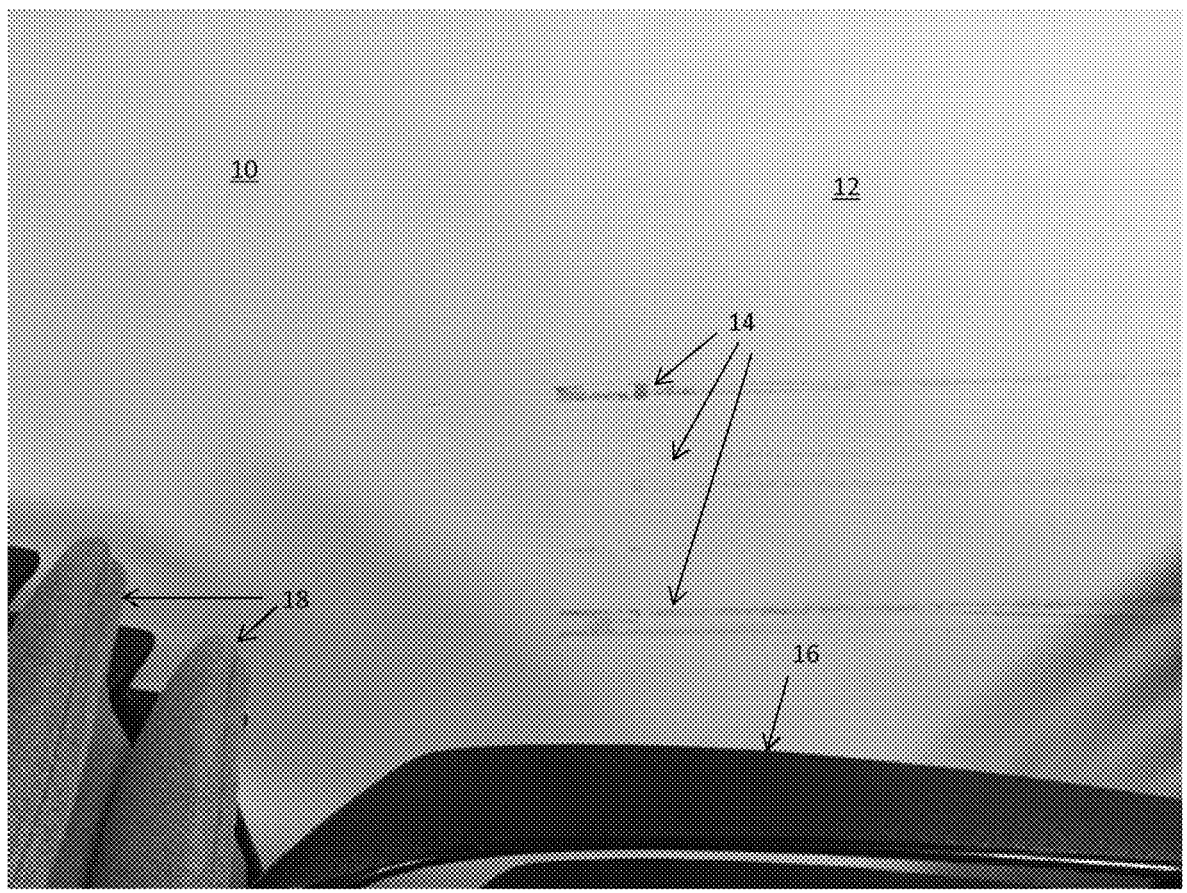
FIG. 1 is a photograph of a wall in a high traffic area showing a side-by-side comparison of the inventive paint and a conventional scuff resistant paint.

The present inventors have discovered that wax when used in certain or predetermined amounts and in combination with a hydrophobic aqueous latex resin produces paint films that resist scuffing and chipping. A preferred hydrophobic aqueous latex resin is disclosed in commonly owned U.S. Pat. No. 8,980,995 entitled "Paints with Improved Water Staining and Color Rub-Off Qualities" to Yang et al and issued on Mar. 17, 2015. The '995 patent teaches a hybrid latex polymer, wherein the latex comprises a hydrophobic or wax center entrapped by a polymeric shell, hereinafter "wax seeded latex". The '995 patent is incorporated by reference herein in its entirety. The present invention uses this wax seeded latex in various architectural coatings, such as paints and stains, preferably for specific applications, e.g., for high traffic area walls, such as hallways and dressing rooms.

Without being bound to any particular theory, although the wax centers in the wax seeded latex do not significantly migrate to the surface of the latex, they provide hydrophobicity to the paint films to improve resistance to water softening and staining, and to increase hardness, and the wax particles generally migrate to the surface of the paint films to provide slippage so that foreign objects when rubbed against the inventive paint films have lower tendency to scuff.

I. Hybrid Latex Polymers or Wax Seeded Latex Disclosed in U.S. U.S. Pat. No. 8,980,995

The commonly owned U.S. Pat. No. 8,980,995 teaches a latex paint's improved resistance to water staining and color rub-off, while maintaining excellent scrubability and oil stain release properties. Unlike the other hydrophobic solid polymer additives, which are loosely bound on the surface of the dry film or at the interface of the latex particles, these hybrid latex polymers entrap hydrophobic compounds in the matrix polymer. The hybrid latex polymer comprises one or more hydrophobic compounds and one or more matrix polymers, wherein the hydrophobic compounds are entrapped in the structure of the matrix polymers (not just on the surface of the matrix polymers).

Without being bound by mechanism, the hybrid latex polymers may have a core-shell structure or any heterogeneous morphology. The shell or second phase of the hybrid latex polymer may have the same or similar monomer composition as the homogeneous latex polymer to improve compatibility and/or have a self crosslinking mechanism to create a substantially uniform crosslinking network to improve mechanical strength. The hybrid latex polymer comprises one or more hydrophobic compounds and one or more matrix polymer, wherein the hydrophobic compound is entrapped in the structure of the matrix polymer, not simply added or blended into the formulation or into a paint composition.

The hydrophobic compounds can be silicones, silicone modified alkyds, low molecular weight polyethylene, low molecular weight polypropylene and paraffins, and the matrix polymer can be formed from any of the following monomers: (meth)acrylates, styrenated monomers, vinyl esters, and other ethylenically unsaturated monomers.

"Hydrophobic compound" is defined to mean a hydrophobic compound, which is a solid or has a 50% distillation temperature of at least over 200° C., and is preferably a (1) silicone or silicone modified polymer dispersion, (2) fluorinated polymer dispersions having a molecular weight of from a few hundred to over a million, (3) dispersion of hydrocarbon polymers with molecular weight from a few hundred to over a million, (4) polymers containing long alkane structure units on backbone or side chains or (5) mixtures thereof.

The preferred hydrophobic compounds are solids in a dispersion, most preferably an aqueous dispersion. More preferably, the hydrophobic compounds comprise, without limitation, silicones, paraffins and mixtures thereof. More preferably, the hydrophobic compounds comprise, without limitation, silicone oil, reactive silicone oil, silicone modified urethanes, silicone modified alkyds, low molecular weight polyethylene, low molecular weight polypropylene, and mixtures thereof.

"Low molecular weight" is defined as from about 200 to about 1000 either weight average molecular weight or number average molecular weight. "Paraffin" is defined as a low molecular weight polyethylene. "Monomer mix" refers to the combination of monomers used to create the matrix polymer. The "matrix polymer" is known to one of ordinary skill in the art and is formed from ethylenically unsaturated monomers such as (meth)acrylates, styrenated monomers, vinyl esters, and other ethylenically unsaturated monomers.

Examples of (meth)acrylates include, but are not limited to, various ($C_1$-$C_{20}$) alkyl or ($C_3$-$C_{20}$) alkenyl esters of (meth)acrylic acid; for example without limitation, methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate, ethoxypropyl (meth)acrylate lauryl acrylate, methyl methacrylate, butyl methacrylate, ethyl methacrylate, isodecyl methacrylate, and lauryl methacrylate. The expression (meth)acrylic acid is intended to serve as a generic expression embracing both acrylic and methacrylic acid. Similarly, the expression (meth)acrylate is intended as a generic expression embracing both acrylic acid and methacrylic acid esters.

Examples of styrenated monomers include, but are not limited to, styrene, alkylstyrenes (e.g., α-ethylstyrene, α-methylstyrene, vinyl toluene, 2,4-dimsthylstyrene, 4-t-butylstyrene, and the like), and halostyrenes (e.g., α-bromostyrene, 2,6-dichlorostyrene, and the like).

Examples of vinyl esters include, but are not limited to, vinyl carboxylate alkyl ethers (e.g., vinyl acetate, vinyl propionate, vinyl butyrates, vinyl benzoates, halo-substituted versions thereof such as vinyl chloroacetate, and the like), and veova monomers.

Other ethylenically unsaturated monomers that can be used as co-monomers include, but are not limited to, carboxylic group-containing of monomers, hydroxyl group-containing monomers, amide group-containing monomers, amino group-containing monomers, epoxy group-containing monomers, vinyl group-containing monomers and related oligomers. Non-limiting examples are acrylic acid (AA), methacrylic acid (MAA), itaconic acid (IA), itaconic acid half ester, maleic acid, maleic acid half ester, maleic anhydride and the like, hydroxyethyl acrylate (HEA), hydroxyethyl methacrylate (HEMA), hydroxypropyl (meth)acrylate, hydroxybutyl acrylate, mono(meth)acrylic acid ester of allyl alcohol polyhydric alcohol and the like, 2-aminoethyl (meth)acrylate, dimethylaminoethyl (meth)acrylate, diethylaminoethyl (meth)acrylate, 3-aminopropyl (meth)acrylate, 2-butylaminoethyl (meth)acrylate, vinylpyridine and the like, acrylamide, maleinamide dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof.

Another group of monomers, which may be used in the matrix polymer, also contain reactive functional groups, but those groups are capable of crosslinking the polymer after the coatings products using the polymers are applied. Such monomers are collectively termed "crosslinkable monomers", such as "keto" or carbonyl containing monomers. Non-limiting examples are methyl vinyl ketone, ethyl vinyl ketone, butyl vinyl ketone (meth)acrolein, crotonaldehyde, diacetone(meth)acrylamide, diacetone (meth)acrylate and mixed esters of aliphatic diols with (meth)acrylic acid and acetoacetic acid, diacetonemethacrylamide, acetoacetoxyethyl methacrylate (AAEM), maleic anhydride, itaconic anhydride, citraconic anhydride, and diacetone acrylamide (DAAM); glycidyl meth(acrylate), β-methylglycidyl meth (acrylate), 3,4-epoxycyclohexylmethyl meth(acrylate), 3,4-epoxycyclohexylethyl meth(acrylate), 3,4-epoxycyclohexylpropyl meth(acrylate), allylglycidyl ether, allylglycidyl ether; N-methylol acrylamide, and those "oxidatively crosslinking" monomers, which utilize atmospheric oxygen but need no crosslinking agent in their composition to form oxidative crosslinks, and the like.

The crosslinkable monomers allow the aqueous latex resins and the paint or architectural compositions that incorporate the crosslinkable monomers to cure by evaporation, coalescence and/or reaction after the paint or architectural compositions are applied on a substrate without the need for heat or UV curing.

Additional monomers which may be used in the matrix polymer include ethyleneureido-functional monomers; allyl acetoacetate; ethylene; propylene; butadiene; and other vinyl esters; vinyl monomers, such as vinyl chloride, vinyl toluene, and vinyl benzophenone; vinylidene chloride, maleic anhydride; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl (meth)acrylate; phosphoalkyl (meth)acrylates, such as phosphoethyl(meth)acrylate, phosphopropyl (meth)acrylate, and phosphobutyl(meth)acrylate; phosphoalkyl crotonate, phosphoalkyl maleate; phosphoalkyl fumarate; phosphodialkyl(meth)acrylate; phosphodialkyl crotonate; and allyl phosphate. allyl methacrylate, diallyl phthalate, 1,4-butyleneglycol dimethacrylate, 1,2-ethyleneglycol dimethacrytate, 1,6-hexanediol diacrylate, and divinyl benzene.

The polymerization process required to form the hybrid latex polymers of the invention is an emulsion polymerization (as is known in the art) of the monomers used to form the matrix polymers, with the addition of the emulsion polymerization taking place in the presence of the hydrophobic compounds.

In one embodiment of the hybrid latex polymers, the hydrophobic compounds are seeds in an emulsion. The hybrid latex polymers are typically polymerized in a latex system comprising water, surfactant, the desired monomers for the matrix polymer, the hydrophobic compound, an initiator, an optional polymer molecular weight control agent, an optional pH adjuster, an optional chaser agent, an optional coalescence aid, an optional defoamer, and an optional preservative, each of which can be added at various times. In one embodiment, the polymerization process takes place in an environment wherein no solvent is present.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the and combinations thereof.

Examples of initiators and chaser solutions useful in the polymerization process may include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjusters can be added for purposes other than adjusting pH, e.g., emulsion stabilization, and yet are still characterized herein as pH adjusters.

Polymer molecular weight control agents are designed to control (usually to limit) the molecular weight of a propagating polymer. While polymer molecular weight control agents may include things like radiation, they are typically molecules added to the polymerization mixture. Examples of polymer molecular weight control agents include, but are not limited to, chain transfer agents (CTAs), e.g., alkyl mercapto-esters such as isooctyl mercaptopropionate, alkyl mercaptans, and the like, and combinations thereof. Chain transfer agents typically operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system.

One non-limiting polymerization method for making these hybrid latex polymers comprises charging a reactor with seeds, wherein the seeds comprise hydrophobic compounds, wherein the hydrophobic compounds are present in a dispersion, heating the reactor to a specified temperature, adding an initiator and monomer mix to the reactor, maintaining the reactor at a specified temperature until the polymerization is substantially complete (less than about 2 weight % of unreacted monomer is present), and adding a chaser to the reactor, wherein the steps of the method occur in order. After the chaser is added, less than about 0.5 weight % unreacted monomer is present.

Another suitable emulsion polymerization method comprises charging a reactor with a portion of an initiator and a small portion of monomer mix (up to about 5% by weight), heating the reactor to 80° C. after 15 minutes, continuing feeding the monomer mix and initiator over a period of 2 to 4 hours. When a portion of monomer feed is completed, the method includes adding seeds to the reactor, wherein the seeds comprise hydrophobic compounds, and resuming the charging of the remaining portion of the initiator and monomer mix. The resulting product is a mixture of a homo latex polymer and a hybrid latex polymer with hydrophobic seeds. Without limitation, in one embodiment, this polymerization process occurs with no solvent present.

In one embodiment, the hydrophobic compounds are added preferably after at least 40% of the matrix polymer is polymerized.

The hybrid latex polymers of the '995 patent are useful in latex paints. The paint comprises a hybrid latex polymer, optionally one or more binders, one or more biocides, one or more deformers, one or more rheology modifiers, one or more extender pigments/colorants, one or more pigments, and one or more other additives.

Examples of biocides or preservatives useful in the polymerization and/or paint process may include, but are not limited to, hydroxy-functional aza-dioxabicyclo compounds such as those commercially available from ISP under the tradename Nuosept™ 95, those compounds sold under the tradename SKANE™, isothiazolones such as those sold under the tradename Kathon™, Polyphase™ additives from Troy Corp. and the like, and combinations thereof.

Coalescence aids assist the formation of a film during the drying process of the paint that incorporates the hybrid latex polymers. Examples of low-VOC (volatile organic compounds) coalescing agents can include, but are not limited to, fatty acid alkylene glycol monoesters (e.g., those compounds sold under the tradename Archer RC™ from Archer Daniels Midland), aromatic alkoxylates (e.g., cresol propoxylates such as those compounds sold under the tradename PLURACOAT™, including PLURACOAT™ CA120, PLURACOAT™ CA110, and PLURACOAT™ CA100), those compounds sold under the tradename EDENOL™ from Cognis (e.g., EDENOL™ EEC 100), those compounds sold under the tradename OPTIFILM™ from Eastman Chemical (e.g., OPTIFILM™ Enhancer 400), and the like, and combinations thereof. While less preferred, the composition can contain traditional (VOC) coalescence aids, which can include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carhitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical), phosphate salts such as potassium tetrapyrophosphate, plasticizers such as dihutyl phthalate, and the like, and combinations thereof.

Examples of defoamers useful in the polymerization and/or paint compositions (discussed below) may include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

Example 1. Preparation of AcrylicEmulsion Polymer using Silicone Elastomer as Seeds for Polymerization The emulsion polymerization is carried out in a four-neck flask under nitrogen purge. The reaction flask is equipped with a condenser, a thermometer, an agitator and a feeding pump. The flask is immersed in a temperature controlled water bath maintained at a constant temperature within about ±0.1° C., of the set point. Table 1 shows the ingredients used for the polymerization.

TABLE 1

| Component | Parts (by weight) |
|---|---|
| Initial Charge in Reactor | |
| Deionized water | 46.0 |
| Sodium alphaolefin sulfonate 40% (RHODACAL A-246) | 0.07 |
| Sodium bicarbonate | 0.05 |
| Initial Seed | |
| Silicone dispersion (Dow Corning ® 84[1]) | 3.2 |
| Monomer Mix | |
| Deionized water | 10.1 |
| Diacetone acrylamide | 0.7 |
| Sodium alphaolefin sulfonate 40% | 1.4 |
| Ethoxylated phosphate ester 25% (Rhodafac RS 610) | 1.4 |
| Methacrylic acid | 0.37 |

TABLE 1-continued

| Component | Parts (by weight) |
|---|---|
| Methylmethacrylate | 16.1 |
| Butyl acrylate | 13.8 |
| Initiator Solution 1 | |
| Ammonium persulfate | 0.09 |
| Deionized water | 0.92 |
| Initiator Solution 2 | |
| Ammonium persulfate | 0.09 |
| Deionized water | 1.8 |
| Chaser solutions | |
| 1) Oxidizing agent | |
| t-butylperoxide | 0.06 |
| Deionized water | 0.5 |
| 2) Reducing agent | |
| Bruggolite ® FF6M | 0.05 |
| Deionized water | 0.7 |
| Sodium hydroxide solution 50% | 0.23 |
| Deionized water | 0.46 |
| Adipic acid dihydrazide | 0.23 |
| Deionized water | 0.69 |
| Deionized water (rinse) | 0.8 |
| TOTAL | 100 |

[1]Dow Corning ® 84 is micronized silicone elastomer dispersion with 40% solid content.

The reaction starts with charging deionized water, sodium alphaolefin sulfonate, and sodium bicarbonate to the reaction flask. The rector was heated to 75° C. under agitation and then the seeds of silicone dispersion were charged to the reactor. After mixing for 5 minutes, the initiator solution 1 was added to the reaction flask. Thereafter, the monomer mix, which was premixed in a separate flask, and initiator solution 2 were fed to the reaction flask over a period of 3.5 hours. A small amount of deionized water was used to rinse the monomer mix flask and addition funnels after feeding was complete. The temperature of the reaction flask was maintained at 80-85° C. for one hour after which it was cooled to about 65° C. Chaser solutions made from oxidizing agent and reducing agent were fed to the reaction flask over 30 minutes. The reaction contents were then cooled to 35° C., and sodium hydroxide solution and adipic acid dehydrazide solution were added.

All percentages in this specification are weight percentages unless otherwise noted. The Tg values in this specification are from the Fox Equation unless otherwise noted. The final polymer emulsion has a solid content of 31.7%. The dried polymer has a Tg of 14.5° C.

Example 2. Preparation of Acrylic Emulsion of using Modified Paraffin Wax Emulsions as Seeds for Polymerization The process and reaction conditions for this example are the same as used in the Example 1, Table 2 shows the ingredients of the reaction.

TABLE 2

| Component | Parts (by weight) |
|---|---|
| Initial Charge in Reactor | |
| Deionized water | 35.2 |
| Sodium alphaolefin sulfonate 40% (RHODACAL A-246) | 0.07 |
| Sodium bicarbonate | 0.05 |

TABLE 2-continued

| Component | Parts (by weight) |
|---|---|
| Initial Seed | |
| Modified Paraffin Wax Emulsion (Aquacer ® 539, 32% By BYK Chemie) | 12.2 |
| Monomer Mix | |
| Deionized water | 7.5 |
| Diacetone acrylamide | 0.7 |
| Sodium alphaolefin sulfonate 40% | 1.1 |
| Ethoxylated phosphate ester 25% (Rhodafac RS 610) | 1.4 |
| Methacrylic acid | 0.43 |
| Methymethacrylate | 16.8 |
| Butyl acrylate | 16.7 |
| Initiator Solution 1 | |
| Ammonium persulfate | 0.07 |
| Deionized water | 0.7 |
| Initiator Solution 2 | |
| Ammonium persulfate | 0.07 |
| Deionized water | 1.4 |
| Chaser solutions | |
| 1) Oxidizing agent | |
| t-butylperoxide | 0.05 |
| Deionized water | 0.4 |
| 2) Reducing agent | |
| Bruggolite ® FF6M | 0.05 |
| Deionized water | 0.5 |
| Sodium hydroxide solution 50% | 0.3 |
| Deionized water | 2.5 |
| Adipic acid dihydrazide | 0.36 |
| Deionized water | 1.0 |
| Deionized water (rinse) | 0.4 |
| TOTAL | 100 |

The polymer emulsion has a solid content of 40% by weight and a Tg of 8.8° C.

Example Preparation 3. Preparation of Acrylic Emulsion Polymer using Silicone Modified Alkyd Emulsion as Seeds for Polymerization The polymerization was done with the same conditions as in Example 1. Table 3 shows the ingredients of the reaction.

TABLE 3

| Component | Parts (by weight) |
|---|---|
| Initial Charge in Reactor | |
| Deionized water | 16.2 |
| Sodium alphaolefin sulfonate 40% (RHODACAL A-246) | 0.05 |
| Initial Seed | |
| Silicone Alkyd Emulsion 40% (WorleeSol SE 420W from Worlee-Chemie) | 45.9 |
| Monomer Mix | |
| Deionized water | 5.4 |
| Diacetone acrylamide | 0.5 |
| Sodium alphaolefin sulfonate 40% | 0.9 |
| Ethoxylated phosphate ester 25% (Rhodafac RS 610) | 1.1 |
| Methacrylic acid | 0.2 |

TABLE 3-continued

| Component | Parts (by weight) |
|---|---|
| Methylmethacrylate | 12.7 |
| Butyl acrylate | 12.5 |
| Initiator Solution 1 | |
| Ammonium persulfate | 0.05 |
| Deionized water | 0.5 |
| Initiator Solution 2 | |
| Ammonium persulfate | 0.05 |
| Deionized water | 1.1 |
| Chaser solutions | |
| 1) Oxidizing agent | |
| t-butylperoxide | 0.04 |
| Deionized water | 0.3 |
| 2) Reducing agent | |
| Bruggolite ® FF6M | 0.03 |
| Deionized water | 0.4 |
| Sodium hydroxide solution 50% | 0.3 |
| Deionized water | 0.3 |
| Adipic acid dihydrazide | 0.1 |
| Deionized water | 1.1 |
| Deionized water (rinse) | 0.3 |
| TOTAL | 100 |

The polymer emulsion has a solid content of 45% with 50% of solids being silicone modified alkyd seeds. The Tg of the acrylic polymer is about 8.8° C.

The hybrid latex polymers taught in the '995 patent are also being referred as wax seeded latex polymers in the '995 patent, and are also referred herein as such. The '995 patent also teaches the making of latex blends, which are blends of conventional polymer particles and wax seeded polymer in Examples 5 and 6 of the '995 patent. The '995 patent also teaches paint compositions made with the wax seeded latex in Examples 7, 8 and 9; however, these paint compositions only utilize conventional styrene acrylic polymers or mixtures of the wax seeded polymers and acrylic polymers. The problems that the '995 patent sought to solve are improved resistance to water staining and color rub-off, as discussed in the Abstract and column 1.

II. Suitable Waxes

The waxes suitable for the inventive anti-scuff or anti-chip paints include synthetic or natural waxes. Synthetic waxes include but are not limited to polyethylene (PE), oxidized PE, polypropylene, Fischer-Tropsch (FT) waxes, ethylene bis-stearamide (EBS) and erucamide. Natural waxes include but are not limited to candelila, carnauba, montan, and petroleum waxes, such as paraffins and microcrystalline waxes. Waxes that are used for the wax centers/cores in the wax seeded latex resin from tie '995 patent, discussed above, may also be used. The suitable waxes are available as solids, such as micronized powder or fine powder forms having average particle sizes (mV) from about 1 microns (μm) to about 25 μm, preferably about 3 μm to about preferably about 5 μm to about 20 μm, and as dispersions of wax in water or another solvent.

Preferably, high density PE powder (HDPE) waxes having one or more ranges of average particle sizes are used. HDPE have substantially linear polymer chains that are minimally branched. HDPE have density in the range of 0.94 g/cm$^3$ to about 0.99 g/cm$^3$. Higher densities HDPE are preferred and due to the micronized sizes of the powder waxes, the density of the suitable HDPE waxes are about 0.98 g/cm$^3$ to about 0.99 g/cm$^3$. Preferred HDPE waxes are also oxidized HDPE.

Micronized wax powders are available commercially from Honeywell as ACumist micronized, oxidized polyethylene powders having average particle sizes (mV) from about 6 to about 7.5 μm, from about 10 to about 13 μm, from about 16 to about 19 μm and designated as the ACumist A-6, A-12 and A-18, respectively. Combinations of these particle sizes can be used in the same paint composition. Other suitable, commercially available oxidized HDPE wax powders include but are not limited to Petrolite C and Petrolite E classes from Baker-Petrolite Corporation.

Wax dispersions are available commercially from Michelman as Michem Emulsion at various solid %, including a range of about 34.5% to about 35.5% or about 35% wax solid, which preferably are HDPE nonionic wax emulsion discussed above, dispersed in a non-solvent or aqueous medium.

III. Inventive Paint Compositions using Way Seeded Latex and Wax

The present inventors have invented solutions to the problems of scuffing and chipping of the paint coatings in high traffic areas and in tight spaces, such as dressing rooms in department stores, where multiple scrapings of the wall paints are created by consumers, clothes hangers, shoes, etc., and hallways and conference rooms in office and other commercial buildings. The present inventors have utilized the wax seeded latex polymers admixed with a wax in the architectural compositions and optionally with polyurethane resin, Without being bound to any particular theory, the present inventors believe that the combination of wax and wax seeded latex polymers decreases the friction on the dried paint surface and allows objects that are being dragged across the paint surface to slip rather than to rub-off on to the paint film materials from these objects.

According to one embodiment of the present invention, the wax seeded latex of the '995 patent is used in architectural compositions that also comprise a urethane dispersion and a dry or emulsified wax. Preferably, the wax seeded latex is a wax seeded acrylic latex or has an acrylic matrix outside of the wax seed. This architectural composition also includes an opacifying pigment, such as titanium dioxide. Additives, such as antimicrobial preservative, mildewcide, dispersants, surfactants, defoamers, coalescent aids, rheological modifiers, discussed above in connection with the '995 patent, can be used in the inventive architectural compositions. The inventive architectural compositions can be tinted to any color and are resistant to scuffing, as well as chipping. An example of this inventive architectural coating is shown below.

Example 4: Scuff Resistant Paint (Eggshell Finish, 1-Base)

| | Gallons | Pounds |
|---|---|---|
| Pigment Grind: | | |
| Water | 12.005 | 100.000 |
| Antimicrobial Preservative | | 2.000 |
| Mildewcide | | 1.000 |
| Dispersant | | 9.000 |
| TiO$_2$ | | 280.000 |

-continued

|  | Gallons | Pounds |
|---|---|---|
| Defoamer |  | 0.500 |
| Surfactant |  | 4.000 |
| PE Wax † |  | 50.000 |
| Water | 2.401 | 20.000 |
| Resin: |  |  |
| Wax Seeded Latex ≠ | 38.793 | 337.500 |
| Polyurethane resin ‡ |  | 155.500 |
| Ammonia |  | 1.500 |
| Anionic surfactant |  | 2.000 |
| Coalescent aid ¶ |  | 23.000 |
| Water | 362.1 | 30.159 |
| Defoamer |  | 2.000 |
| Rheology Modifier 1 |  | 16.000 |
| Rheology Modifier 2 |  | 3.000 |
| Rheology Modifier 3 |  | 2.000 |
| Defoamer |  | 8.000 |
|  | 100.000 | 1047.159 |

† commercially available as ACUMIST A12.
≠ see commonly owned U.S. Pat. No. 8,980,995
‡ commercially available as NEOREZ R-9035
pH: 9.0-9.2
Weight/gallon: 10.49-10.74 lbs.
Viscosity (KU): 94.0-100.0
Viscosity (ICI): 0.800-1.400
Total solids: 53.156% by weight; 40.619% by volume In Example 4, the ratio by weight of wax seeded latex to urethane resin is about 2.17:1, and the ratio by weight of pigment to PE wax is about 5.6:1. The ratio by weight of wax seeded latex to coalescent aid is about 14.7. These ratios can vary up to ±10% or ±5% or preferably ±2.5%. The ratio for wax seeded latex to coalescent aid can vary up to 2× or ½× the ratio in Example 4. All ratios discussed herein are weight ratios, unless otherwise indicated.

In Example 4, the wax used in the composition, ACumist A12, is a micronized, oxidized PE wax having an average particle size (mV) from about 10 μm to about 13 μm, and the weight percentage of wax particles in the inventive composition with wax seed latex is (50 lbs./1047 lbs.) about 4.77%.

According to another embodiment of the present invention, the wax seeded latex of the '995 patent is used in an architectural composition that is resistant to chipping of the dried paint film. Preferably, the wax seeded latex is a wax seeded acrylic latex or has an acrylic matrix outside of the wax seed. The architectural coating also comprises an opacifying pigment and a wax. The architectural coating tray also have a polymeric pigment and an amount of coalescent aid of about 2.5 wt. % or higher, as discussed below. The inventive architectural composition can be tinted to any color and display resistant to chipping, as well as scuffing. This embodiment can be used in a semi-gloss finish as paints for trims. An example of this inventive architectural coating is shown below.

Example 5: Chip Resistant Paint (1-Base)

|  | Gallons | Pounds |
|---|---|---|
| Pigment Grind: |  |  |
| Water | 7.224 | 60.175 |
| Antimicrobial Preservative |  | 2.507 |
| Mildewcide |  | 1.254 |
| Neutralizer |  | 1.003 |
| Dispersant 1 |  | 10.029 |

-continued

|  | Gallons | Pounds |
|---|---|---|
| Dispersant 2 |  | 4.012 |
| TiO₂ |  | 240.702 |
| kaolin 1 extender |  | 25.073 |
| kaolin 2 extender |  | 15.044 |
| Defoamer 1 |  | 0.953 |
| Surfactant 1 |  | 5.015 |
| Surfactant 2 |  | 2.006 |
| PE wax § |  | 30.088 |
| Defoamer 2 |  | 2.006 |
| Resin |  |  |
| Wax seeded latex ≠ | 55.853 | 485.917 |
| polymeric synthetic pigment |  | 40.117 |
| Coalescent aid ¶ |  | 30.088 |
| Rheology modifier 1 |  | 16.649 |
| Surfactant |  | 1.504 |
| Associative Thickener |  | 4.012 |
| Water | 3.583 | 29.843 |
| Optional Defoamer |  | 0.000 |
|  | 100.000 | 1007.997 |

§ commercially available as MICHEM Emulsion 93235
≠ see commonly owned U.S. patent No. 8,980,995
¶ commercially available as Optifilm 400 or Texanol
pH: 8.6-8.8
Weight/gallon: 10.49-10.74 lbs.
Viscosity (KU): 92.0-97.0
Viscosity (ICI): 1.200-1.600
Total solids: 54.584% by weight; 43.073% by volume In Example 5, the ratio by weight of pigment to PE wax is about 8:1, and the ratio by weight of the wax seeded latex to polymeric synthetic pigment is about 12.11:1. The ratio by weight of wax seeded latex to coalescent aid is about 16.15. These ratios can vary up to ±10% or ±5% or preferably ±2.5%. The ratio for wax seeded latex to coalescent aid can vary up to 2× or ½× the ratio in Example 5. Without being bound to any particular theory, the coalescent aid of 2.5 wt. % or higher improves the chipping resistance of the film. In Example 5, the architectural coating is formulated to form flexible dried films to absorb impacts without chipping.

In Example 5, the wax used, MICHEM Emulsion 93235, is an aqueous dispersion of PE wax with 35% wax solid, and the weight percentage of wax particles in the inventive composition with wax seed latex is (0.35×30 lbs./1.008 lbs.) about 1.04%.

As shown above, the wax seeded latex disclosed in the '995 patent is incorporated into architectural coatings that include a wax, preferably a PE wax, to improve the dried film's chip and scuff resistance. The inventive architectural coatings may also include a polyurethane resin, as shown in Example 4, or a polymeric synthetic pigment as shown in Example 5. A coalescent aid is preferably used in the inventive coatings and may have beneficial effects by aiding dried films to resist chipping.

Figure 2:
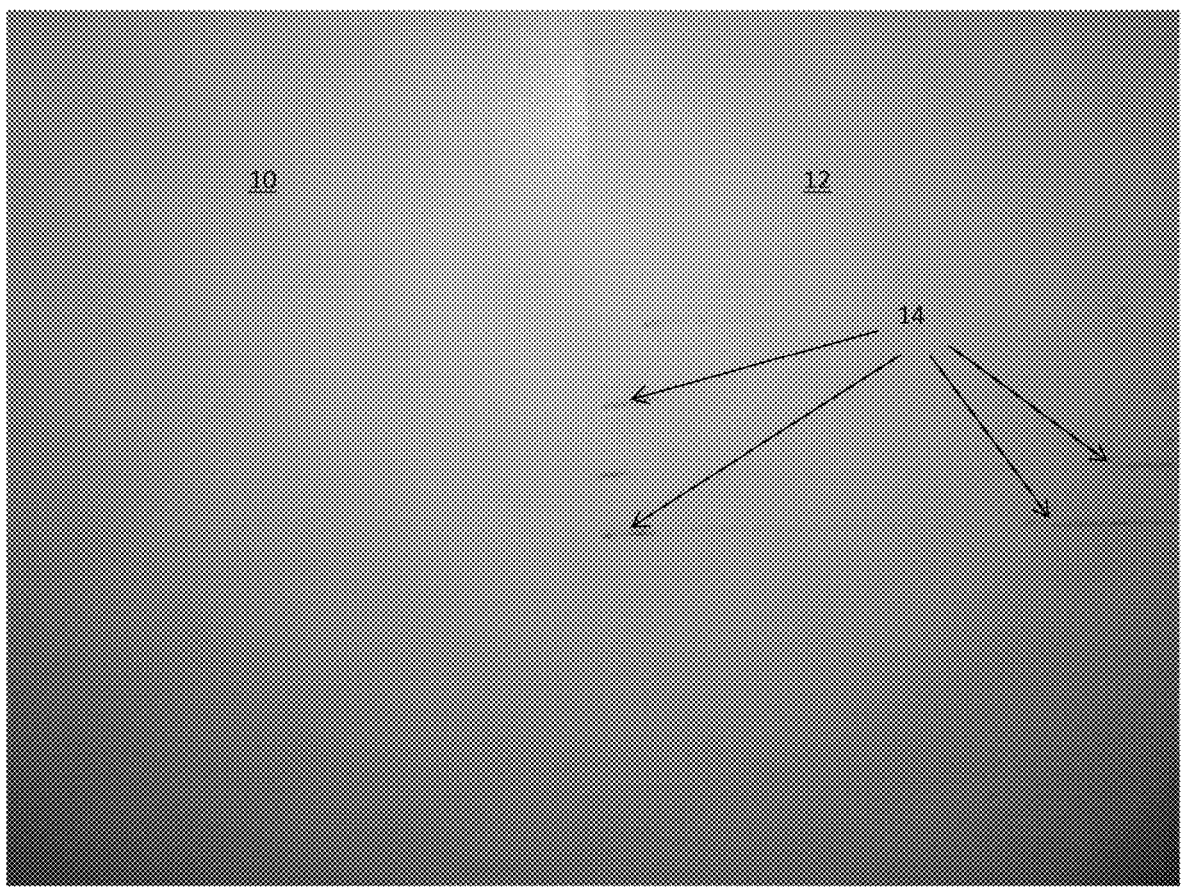
FIG. 2 is another photograph similar to FIG. 1.

A paint composition according to Example 4 was painted in a hallway where office chairs are stacked and stored adjacent to the painted wall. The inventive composition formed a paint film 10 on the left side of the photograph in FIG. 1 and a conventional, commercial anti-scuff paint composition formed a paint film 12 on the right side of the same photograph. Arms 16 of chairs 18 formed scuff marks 14 an conventional paint film 12, but left no visually discernable marks on inventive anti-scuff film 10. FIG. 2 shows another comparative anti-scuff results but with the chairs removed for clarity. FIGS. 1 and 2 illustrate the anti-scuff property of the present invention.

In another field test, the inventive paint composition of Example 4 was painted in one fitting room in a clothing department store in mid-town Manhattan in New York City. FIGS. 3A-3C show the types of marks, i.e., scuff, stain and lipstick, respectively, that can blemish a surface painted with a conventional paint. Generally, fitting rooms are painted weekly to cover the scuffs and stains. FIGS. 4A-4C show the same fitting room about four weeks after the inventive paint composition was applied. The painted surfaces visually appear clean and without scuff or stain marks.

A second field test was conducted where one wall in seven fitting rooms at the same clothing department store was painted with the inventive paint composition. These walls were significantly stained and scuffed before being painted with one coat of the inventive paint composition, and one problem area was re-touched. These walls were inspected about 11 weeks later, and the walls remained in pristine conditions. Two small marks were found and were readily removed with a conventional cleanser and rag, discussed below.

Based on Examples 4 and 5, the range of weight percentage of wax is from 1.04% to 4.77%. The range of pigment to wax weight ratios is from 5.6 to 8. The range of wax seeded latex to coalescent aid weight ratios is from 14.7 to 16.15.

IV. Additional Anti-Scuff Paint Formations

Traditional paint compositions are tinted at the retail stores with colorants to produce the final colored paints that the consumers purchase. Typically, tintable paints can be mixed with colorants to make paints in five finishes (flat, matte, eggshell, satin and semi-gloss). Tintable paints can be classified into four bases, such as white, pastel/light, deep, or medium/mid-tone. Each base contains a different amount of opacifying pigments, such as titanium dioxide. Final paint colors depend significantly on the amount of $TiO_2$ white pigments in the tintable base. For example, deep colors require lower amounts of $TiO_2$ while pastel colors require higher amounts of $TiO_2$. White and medium bases likewise have different levels of $TiO_2$. Retail stores generally store tintable paints in five finishes and four bases (1 base-4 base), i.e., about 20 different tintable base paints for each paint line.

For example, 1-Base tintable paints for one paint line may have 283 lbs. of opacifying pigment such as $TiO_2$ per 100 gallons for semi-gloss; 202 lbs. per 100 gallons for pearl/satin; 269 lbs. per 100 gallons for eggshell; 218 lbs. per 100 gallons for matt; and 210 lbs. per 100 gallons for flat. As shown in the examples below a 1-Base tintable paint would have the most opacifying pigment; a 2-Base would have less; a 3-Base would have even less and a 4-Base may not contain any opacifying pigment. Tintable paints and their bases and finishes are fully disclosed in published international patent application no. WO 2017/053190, which is incorporated herein by reference in its entirety.

The Examples below provide additional examples of the inventive anti-scuffing paints in 1-Base to 4-Base and in matte, eggshell and satin finishes. All values in the following examples are weights in pounds (lbs.), except for the ratios and percentages reported at the bottom of each chart.

Example 6 shows anti-scuff matte paint compositions for 1-Base to 4-Base.

| Example 6 | Matte 1 Base | Matte 2 Base | Matte 3 Base | Matte 4 Base |
|---|---|---|---|---|
| WATER | 85.000 | 60.000 | 60.000 | 80.000 |
| antimicrobial | 2.000 | 2.000 | 2.000 | 2.000 |
| mildewcide | 1.000 | 1.000 | 1.000 | 1.000 |
| dispersant | 11.000 | 11.000 | 8.000 | 4.250 |
| TiO2 | 270.000 | 109.000 | 34.000 | — |
| ceramic microspheres | 33.000 | | | |
| defoamer | 0.500 | 0.500 | 0.500 | 0.500 |
| surfactant | 5.000 | 5.000 | 5.000 | 5.000 |
| HDPE wax 1 † | 45.000 | 43.000 | 35.000 | 35.000 |
| HDPE wax 2 | | | | |
| HDPE wax 3 | | 40.000 | 38.000 | 38.000 |
| PE wax 4 †† | 20.000 | 20.000 | 20.000 | 20.000 |
| WATER | 10.000 | 5.000 | 5.000 | 5.000 |
| wax seeded latex | 400.000 | 428.999 | 483.999 | 483.999 |
| PU resin | | | | |
| Ammonia | 1.300 | 1.800 | 2.900 | 2.150 |
| anionic surfactant | 2.000 | 2.000 | 2.000 | 2.000 |
| coalescence aid | 25.000 | 25.000 | 20.000 | 20.000 |
| WATER | 103.508 | 124.974 | 30.000 | 20.000 |
| defoamer | 2.000 | 2.000 | 2.000 | 2.000 |
| rheological modifier 1 | 15.000 | 17.000 | 6.500 | 4.800 |
| rheological modifier 2 | 3.000 | 2.000 | | |
| rheological modifier 3 or associative thickener | 11.000 | 16.000 | 10.500 | 10.000 |
| Defoamer | 4.000 | 4.000 | 8.000 | 8.000 |
| WATER | 10.000 | | 89.733 | 94.063 |
| P.G./WATER FLOAT | 13.466 | 13.686 | 14.382 | 14.628 |
| Total weight(lbs.) | 1072.774 | 933.959 | 878.514 | 852.390 |
| Total Wax | 52.000 | 90.000 | 80.000 | 80.000 |
| Wt. % Wax | 4.85% | 9.64% | 9.11% | 9.39% |
| Pigment/Wax | 5.19 | 1.21 | 0.43 | 0.00 |
| Wax seeded latex/coalescent aid | 16.00 | 17.16 | 24.20 | 24.20 |
| Wax seeded latex/PU | n/a | n/a | n/a | n/a |
| Total solid % (Wt./Vol.) | 52.7/39.8 | 45.4/39.6 | 41.4/39.0 | 38.5/37.8 |

†: micronized, oxidized HDPE powder wax. Wax 1 has an average particle size (mV) from about 16 to about 19 μm; wax 2 has an average particle size (mV) from about 10 to about 13 μm; and wax 3 has an average particle size (mV) from about 6 to about 7.5 μm.
††: PE wax dispersion at 35% wax solids.

It is noted that the weight percentage of wax is significantly higher for 2-Base to 4-Base in Example 6.

Example 7 shows anti-scuff eggshell paint compositions for 1-Base to 4-Base.

| Example 7 | Eggshell 1 Base | Eggshell 2 Base | Eggshell 3 Base | Eggshell 4 Base |
|---|---|---|---|---|
| WATER | 100.000 | 100.000 | 80.003 | 100.000 |
| antimicrobial | 2.000 | 2.000 | 2.000 | 2.000 |
| mildewcide | 1.000 | 1.000 | 1.000 | 1.000 |
| dispersant | 9.000 | 9.000 | 8.000 | 4.250 |
| TiO2 | 280.000 | 115.000 | 36.502 | — |
| ceramic microspheres | | | | |
| defoamer | 0.500 | 0.200 | 0.200 | 0.200 |
| surfactant | 4.000 | 4.000 | 5.000 | 5.000 |
| HDPE wax 1 | | | | |
| HDPE wax 2 | 50.000 | 44.000 | 38.002 | 30.000 |
| HDPE wax 3 | | | | 18.000 |
| PE wax 4 | | | | |
| WATER | 22.000 | 22.000 | 2.000 | 2.000 |
| wax seeded latex | 337.500 | 355.000 | 495.020 | 495.000 |
| PU resin | 155.000 | 164.000 | | |
| Ammonia | 1.500 | 1.500 | 2.800 | 2.600 |
| anionic surfactant | 2.000 | 2.000 | 2.000 | 2.000 |
| coalescence aid | 23.000 | 22.000 | 22.001 | 21.500 |
| WATER | 34.513 | 53.294 | 87.679 | 73.596 |
| defoamer | 0.150 | 1.000 | 3.000 | 3.000 |
| rheological modifier 1 | 16.000 | 20.000 | 10.000 | 12.000 |
| rheological modifier 2 | 3.000 | 4.000 | | |

-continued

| Example 7 | Eggshell 1 Base | Eggshell 2 Base | Eggshell 3 Base | Eggshell 4 Base |
|---|---|---|---|---|
| rheological modifier 3 or associative thickener | 2.000 | 5.000 | 14.201 | |
| defoamer | 5.850 | 2.000 | | |
| WATER | | | 58.402 | 55.000 |
| P.G./WATER FLOAT | 13.466 | 13.686 | 14.383 | 14.628 |
| Total weight(lbs.) | 1062.479 | 940.680 | 882.193 | 841.774 |
| Total Wax | 50.000 | 44.000 | 38.002 | 48.000 |
| Wt. % Wax | 4.71% | 4.68% | 4.31% | 5.70% |
| Pigment/Wax | 5.60 | 2.61 | 0.96 | 0.00 |
| Wax seeded latex/coalescent aid | 14.67 | 16.14 | 22.50 | 23.02 |
| Wax seeded latex/PU | 2.18 | 2.16 | | |
| Total solid % (Wt./Vol.) | 52.7/40.0 | 42.4/35.4 | 36.9/33.9 | 34.8/34.0 |

Example 8 shows anti-scuff satin paint compositions for 1-Base to 4-Base.

| Example 8 | Satin 1 Base | Satin 2 Base | Satin 3 Base | Satin 4 Base |
|---|---|---|---|---|
| WATER | 100.000 | 100.000 | 80.000 | 100.000 |
| Antimicrobial | 2.000 | 2.000 | 2.000 | 2.000 |
| Mildewcide | 1.000 | 1.000 | 1.000 | 1.000 |
| Dispersant | 9.000 | 9.000 | 8.000 | 4.000 |
| TiO2 | 260.700 | 114.000 | 35.000 | — |
| ceramic microspheres | | | | |
| defoamer | 0.500 | 0.250 | 0.250 | 0.500 |
| Surfactant | 4.000 | 4.000 | 4.000 | 4.000 |
| HDPE wax 1 | | | | |
| HDPE wax 2 | | | | |
| HDPE wax 3 | 30.000 | 30.000 | 30.000 | 30.000 |
| PE wax 4 | 10.000 | 20.000 | 20.000 | 20.000 |
| WATER | 5.028 | 5.028 | 2.000 | 2.000 |
| wax seeded latex | 365.000 | 317.000 | 509.340 | 509.340 |
| PU resin | 170.000 | 236.200 | | |
| Ammonia | 1.400 | 1.600 | 2.400 | 2.700 |
| anionic surfactant | 2.000 | 2.000 | 2.000 | 2.000 |
| coalescence aid | 21.000 | 20.000 | 15.000 | 15.000 |
| WATER | 29.976 | 35.579 | 22.800 | 24.700 |
| defoamer | 2.000 | 0.150 | 1.000 | 2.000 |
| rheological modifier 1 | 15.000 | 15.000 | 9.000 | 8.000 |
| rheological modifier 2 | 2.500 | 2.500 | | |
| rheological modifier 3 or associative thickener | 1.900 | 6.700 | 9.700 | 10.500 |
| defoamer | 4.000 | 4.000 | 4.000 | 8.000 |
| WATER | | | 109.454 | 93.921 |
| P.O./WATER FLOAT | 13.466 | 13.686 | 14.382 | 14.628 |
| Total weight(lbs.) | 1050.470 | 939.693 | 881.326 | 854.289 |
| Total Wax | 33.500 | 37.000 | 37.000 | 37.000 |
| Wt. % Wax | 3.19% | 3.94% | 4.20% | 4.33% |
| Pigment/Wax | 7.78 | 3.08 | 0.95 | 0.00 |
| Wax seeded latex/coalescent aid | 17.38 | 15.85 | 33.96 | 33.96 |
| Wax seeded latex/PU | 2.15 | 1.34 | | |
| Total solid % (Wt./Vol.) | 51.6/39.4 | 42.4/35.2 | 37.3/34.6 | 34.9/34.1 |

As shown in Examples 6-8, the matte finish has higher wt. % wax, especially in 2-Base to 4-Base, which are above 9 wt. %. Overall, the wt. % of wax across the three finishes are from 3.19% to 9.64%. The preferred range of wt. % of wax is from about 2% to about 12%, more preferably from about 3% to about 10%, and more preferably from about 3% to about 7%.

The preferred range of opacifying pigment/wax ratios is from less than about 8 and can be zero, more preferably less than about 6. The preferred range of wax seeded latex to coalescent aid is from about 15 to about 35, and any two ratios discussed herein can form a range for the wax seeded latex to coalescent aid ratios. When PU resins are used with the wax seeded, the range of ratios of wax seeded latex/PU resin is preferably from about 1.0 to about 2.5, more preferably about 1.25 to about 2.25, and any two ratios discussed herein can form a range for the wax seeded latex to resin ratios.

V. Additional Anti-Chip Paint Composition

All values in the following example are weights in pounds (lbs.), except for the ratios and percentages reported at the bottom of each chart.

Example 9. Low Wax Paint Composition

| | |
|---|---|
| WATER | 90.000 |
| Antimicrobial | 2.500 |
| mildewcide | 1.250 |
| Neutralizing amino alcohol | 1.000 |
| dispersant | 14.000 |
| TiO2 | 254.000 |
| Kaolin 1 | 25.000 |
| Kaolin 2 | 15.000 |
| Defoamer | 0.500 |
| Surfactant | 5.000 |
| Ionic Surfactant | 2.000 |
| PE wax dispersion (35% wax solid) | 10.000 |
| WATER | 25.000 |
| wax seeded latex | 433.909 |
| ammonia | 0.001 |
| aqueous silicone resin | 40.000 |
| synthetic pigment | 40.000 |
| coalescence aid | 30.000 |
| WATER | 20.000 |
| fluorosurfactant | 1.500 |
| rheological modifier 1 | 13.000 |
| rheological modifier 2 | 2.500 |
| rheological modifier 3 | 5.000 |
| defoamer | 3.000 |
| WATER | 27.656 |
| P.G./WATER FLOAT | 13.258 |
| TOTAL | 1075.074 |
| Wt. % Wax | 0.33% |
| Total solid % (Wt./Vol.) | 52.3/40.0 |

The weight percentage of wax in Example 9 is 0.33%, which is low and is similar to that in Example 5, which has a 1.04 wt. % wax. Low wax paint compositions preferably have about 2.0 wt. % of wax or less or preferably 1.75 or 1.5 wt. % of wax or less, preferably having about 1.25 or 1.0 wt. % or less, or 0.5% or less, but more than 0,25 wt. %. Experiments have shown that the lower wax percentage in combination with a relative high coalescent aid of at least 2.8 wt. % (e.g., 30 lbs./1075 lbs.) or at least 2.5 wt. %, preferably at least 3.0 wt. % or at least 3.5%, but less than 5% can provide a paint composition with anti-chipping property.

In Example 9, the ratio by weight of pigment to wax is about 72.6; the ratio by weight of was seeded latex to synthetic extender pigment is about 10.85; the ratio by weight of wax seeded latex to coalescent aid is about 14.46.

The ranges of these ratios for paint compositions that have low wax wt. %, i.e., Examples 5 and 9, are as follows. The range of ratios by weight of pigment to wax if from about 8:1 to 72.6; the range of ratios by weight of wax seeded latex to synthetic extender pigment is about 10:1 to about 12:1; the ratio by weight of wax seeded latex to coalescent aid is about 14:1 to about 17:1.

VI. Addititves to Paint Compostions

The inventive paint compositions discussed herein are cured by evaporation, coalescence and/or reaction after the paint or architectural compositions are applied on a substrate without the need for heat or UV curing.

The inventive architectural composition may include an opacifying pigment, such as titanium dioxide and/or color pigments, and in 4-Base paints opacifying pigments may be omitted. Additives, such as antimicrobial preservative, mildewcide, dispersants, surfactants, defoamers, coalescent aids, etc., discussed above in connection with the making of the wax seeded latex in the '995 patent, can be used in the inventive architectural compositions.

Examples of rheology modifiers useful in the paint compositions may include, but are not limited to, those commercially available from Rohm & Haas (now Dow Chemical Company) under the tradename Acrysol™, such as RM-242, RM-8W, RM-825, RM-5000, RM-2020 NPR and RM-825, Natrasol™ and Aquallow™ from Aqualon Division of Hercules Inc. and UCAR Polyphobe™ from Dow.

While typically multiple pigments/colorants are present in end-use latexes that are to be used in paint or architectural coating applications, sometimes only a white pigment, such as a zinc oxide and/or a titanium oxice, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention may include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions.

Additionally or alternately, extender pigments/colorants can be added. Examples of extender pigments/colorants useful in the paint compositions according to the invention may include, but are not limited to, silica, silicates, carbonates such as calcium carbonates, and the like, and combinations thereof. Ceramic microspheres can also be included as an extender or as a pigment. Suitable ceramic microspheres include, but are not limited to, Zeeospheres, such as Zeeospheres W-410.

The paints of the present invention may further include other additives, such as, emulsifiers, coalescing aids, thickeners or rheology modifiers, freeze-thaw additives, humectants, wetting agents, colorants, waxes, uv-protectants, and anti-oxidants provided that they do not adversely affect the architectural coating's performance or dry film properties.

In one embodiment, as discussed above a paint composition contains the hybrid latex polymer or wax seeded latex, which contains a crosslinkable monomer, such as a "keto", a carbonyl, or an anhydride group, the paint composition contains a crosslinker that will crosslink the "keto", carbonyl, anhydride groups on the hybrid polymer during and after the paint is dried. Examples of the crosslinkable monomers are methyl vinyl ketone, ethyl vinyl ketone, butyl vinyl ketone (meth)acrolein, crotonaldehyde, diacetone (meth)acrylamide, diacetone (meth)acrylate and mixed esters of aliphatic diols with (meth)acrylic acid and acetoacetic acid, diacetonecrylamide, diacetonemethacrylamide, acetoacetoxyethyl methacrylate (AAEM), and diacetone acrylamide (DAAM), maleic anhydride, itaconic anhydride, citraconic anhydride, and the like; examples of a crosslinking agent in the paint composition are hydrazine derivatives, $C_2$-$C_{18}$ saturated dicarboxylic acid dihydrazides such as oxalic acid dihydrazide, malonic acid dihydrazide, glutaric acid dihydrazide, succinic acid dihyrazide, adipic acid dihydrazide, sebacic acid dihydrazide and the like; monoolefinic unsaturated dicarboxylic acid dihydrazides such as maleic acid dihydrazide, fumaric acid dihydrazide, itaconic acid dihydrazide and the like; terephtalic acid dihydrazide or isophthalic acid dihydrazide; pyromellitic acid dihydrazide, trihydrazide or tetrahydrazide; nitrilotrihydrazide, citric acid trihydrazide, 1,2,4-benzene trihydrazide, ethylenediaminetetraacetic acid tetrahydrazide, 1,4,5,8-naphthoic acid tetrahydrazide; polyfunctional hydrazides, hydrazines, semicarhazides, and the like.

In another embodiment, a paint composition containing the hybrid latex polymer of the present invention can be formulated according to the following method without limiting the order of the addition of each ingredient. First, a pigment dispersion composition, or grind, is formed by: combining water, an optional organic solvent, a dispersant, a pH adjuster, a surfactant, a defoamer, a pigment/colorant, and a biocide and/or a preservative; stirring and optionally grinding for a period of time to sufficiently mix the ingredients; and, while continuing to stir and/or grind, adding more water. To this pigment dispersion composition can be added a hybrid latex polymer of the invention, followed by a pH adjuster, if desired, and an optional performance additive composition, such as without limitation, a surfactant, and a defoamer. A coalescence aid may be added. Then, one or more rheology modifiers may be added, optionally including water, and a pH adjuster, forming the paint composition. Additional pigment/colorants may also be added, if desired for shading.

VII. Resistance to Scuff Testing

To the best of the present inventors' knowledge, there is no uniformly accepted test or procedure to determine the resistance of a painted surface to scuffing or the ability to wash such scuff marks. ASTM F2497 is specifically directed to abrasion and scuff resistance of inkjet media. ASTM 15264 is directed to abrasion resistance of printed materials. U.S. Pat. No. 7,291,676 discloses a scuff test for 2 mm thick, 10 cm in diameter plastic disc. None of these procedure is adaptable to the test the ability of paint compositions to resist scuffing. The present inventors propose a scuff testing procedure described below.

Figure 5A:
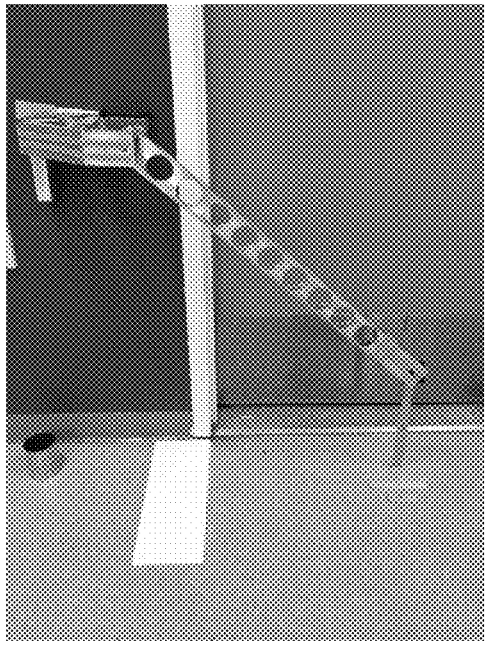
FIGS. 5A-5D are photographs of an internal scuff resistant testing procedure.
Figure 5B:
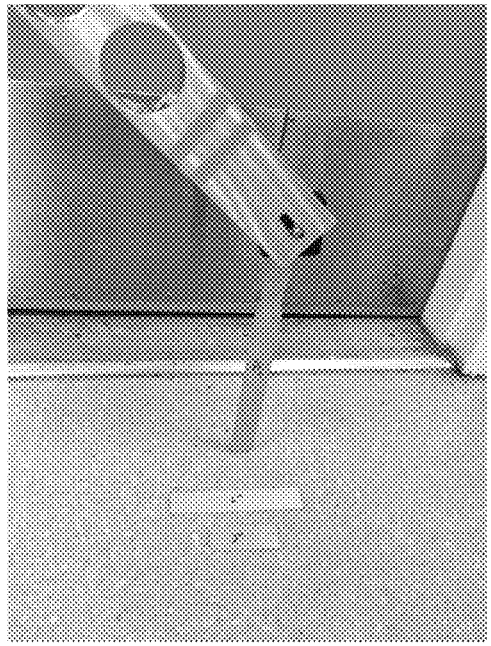
Figure 5C:
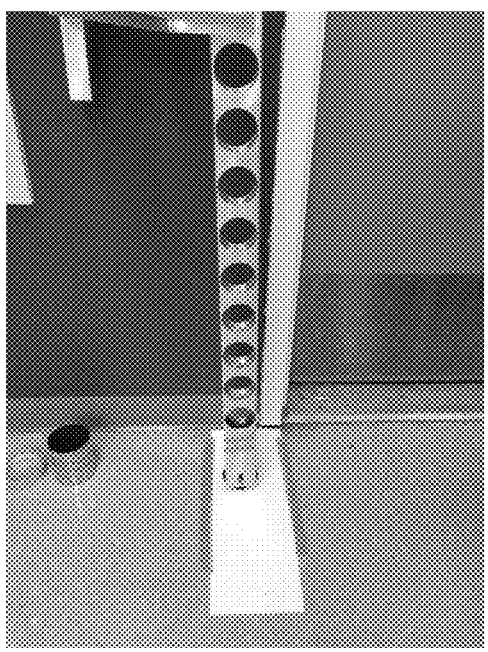
Figure 5D:
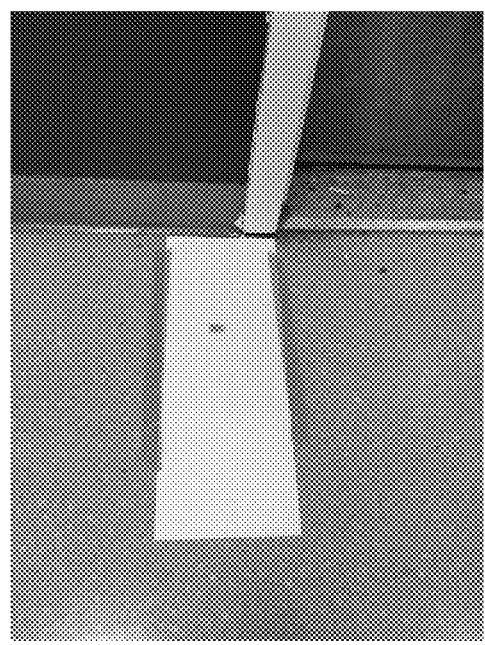

Internal Scuff Testing Procedure. The purpose of this procedure is to test the resistance of scuffs on a paint film and to determine how well a scuff mark, if exists, would wash off. Scuff or scuffing is defined as scraping or brushing a surface, e.g., painted surface, by an object, such as a shoe, furniture, etc. Scuff also includes marks made by scraping or grazing a surface by an object. As illustrated in FIG. 5A, a pendulum arm is pivoted at the upper end to a table surface and has a black heel attached to the free end, as best shown in FIG. 5B. The pendulum arm is sized and dimensioned to swing so that the black heel would contact the painted panel taped on the floor below, as the pendulum arm swings across the panel. The pendulum arm may start the swing at a number of vertical heights above the painted panel, e.g., 12 inches, 6 inches or 3 inches. Each vertical height represents a different potential/kinetic energy level and amount of momentum/force that glances the painted panel, as shown in FIG. 5C. A block, shown in FIGS. 5A and B, representing the vertical height(s) props up the free end of the pendulum arm and is removed to start the swing. Scuff mark(s) on the panel are shown in FIG. 5D.

This internal testing procedure includes the steps of
1) Make a draw down lengthwise on a white, long scrub panel using a 7 mil gap draw down bar.
2) Place the panel in the constant temperature/humidity chamber to cure overnight, or another length of time as predetermined.
3) Lightly sand the black heel attached to the pendulum.
4) Tape the panel to the floor.
5) Prop the bottom of the black rubber onto the 12 inch block.
6) Release the block 10 allow pendulum to swing and mark panel.
7) Kick out the pendulum arm to release from panel,
8) Move the panel 2 inches away from the wall and re-tape.
9) Prop the bottom of the black rubber onto the 6 inch block.
10) Release the block to allow pendulum to swing and mark panel.
11) Pull out the pendulum arm to release from panel.
12) Move the panel 2 more inches away from the wall and re-tape.
13) Prop the bottom of the Hack rubber onto the 3 inch block.
14) Release the block to allow pendulum to swing and mark panel.
15) Pull out the pendulum arm to release from panel.
16) Turn around the panel and repeat steps 4) through 15) so that there will be two sets of marks on the panel.
17) Cut the panel in half so that each half has a 3, 6, and 12 inch mark on it.
18) Make sure to mark under each scuff which height the pendulum was released.
19) Take one of the panels and perform a cleansability procedure: (500 cycles with sponge and cleansability solution—0.25% trisodium phosphate cleaner (TSP), 0.5% nonionic, non-denaturing detergent—octylphenoxypolyethoxyethanol, commercially available as Igepal CO-530).
20) Let dry overnight.
21) Before reading panel on Spectra i5 (spectrophotometer), change the aperture to 10 mm.
22) Calibrate as instructed.
23) Open up Color Reading template.
24) First read the panel that was not cleaned.
25) Measure the standard on the un-scuffed part of the panel. Make sure this is in the line with the scuff marks though.
26) Measure the test area of the 3 inch scuff, report the change in color differences ($\Delta E$).
27) Measure the test area of tlhe 6 inch scuff and 12 inch scuff as well and report $\Delta E$ for each.
28) Once finished, read the panel that was cleaned as well and record $\Delta E$ for each scuff mark that was cleaned.
29) A $\Delta E$ of less than about 2.0, preferably 1.0, more preferably 0.5 may be considered acceptable.
30) A relative comparison of $\Delta E$ at similar scuff heights can differentiate samples.

As discussed in commonly owned U.S. published patent application No. 2017/0088723-A1, colors are sufficiently close to each other to be the same color to people when the color differences ($\Delta E$) among them are less than or equal to about 2.0 CIEDE2000 units, preferably less than about 1.0 CIEDE2000 unit or less than about 0.5 CIEDE2000 unit. Experiments have shown that the human eyes should not be able to distinguish colors or can barely distinguish colors that are within 2.0 CIEDE2000 color difference units from each other.

For scuff marks, which are darker and can be detected more readily from a lighter paint surface, the human eyes shculd not be able to distinguish scuffs that are within 1.0 CIEDE2000 color difference units from each other, and $\Delta E$ of less than 2.0 CIEDE2000 units or less than 1.5 CIEDE2000 may be deemed acceptable.

The value of $\Delta E$ is calculated using a color difference formula, such as, the CIEDE2000 color difference formula for a 10° standard observer. The CIEDE2000 color difference formula is set forth in G. Sharma, W. Wu, and Dalai, "The CIEDE2000 Color-Difference Formula: Implementation Notes, Supplementary Test Data, and Mathematical Observations," *Color Res. Appl.* 30: pp. 21-30, Feb. 2005, which is incorporated herein by reference in its entirety. As noted in the Sharma paper, CIEDE2000 color difference values are calculated by a methodology that transforms measured CIELAB values into CIE L*C*h (lightness, chroma, hue) color space values. The CIEDE2000 color difference equation comprises weighting factors $k_L$, $k_C$, $k_H$ and for the metric lightness difference, metric chroma difference and the metric hue difference, which in the present invention are 1, 1, 1, respectively. Other suitable color difference equations include the CIELUV, CIELAB and the CIE94 color difference equations.

Hence, if the scuff marks measured less than 1.0 CIEDE2000 units then they are likely not to be noticed by human observers. Moreover, if after cleaning as described in the internal test above or with household cleaners, the $\Delta E$ is less than 1.0 CIEDE2000 units then the cleaned surfaces are not likely to exhibit scuff marks noticeable by human observers. As stated above, $\Delta E$ of less than 2.0 CIEDE2000 or 1.5 CIEDE2000 prior to cleaning may be acceptable.

Scuff resistance tests were conducted for the pastel base (1-Base) for the inventive paints shown in Examples 6-8 at the highest vertical height of 12 inches, which represent the highest potential/kinetic energy level. As shown below, the marks on the eggshell and satin paint films are below $\Delta E$ of 2.0, a level that is likely perceivable by people. The mark on the matte finish was readily cleaned to be below this level.

|  | $\Delta E$ (CIE2000 units) | | |
| --- | --- | --- | --- |
|  | Example 6, 1-Base, matte | Example 7, 1-Base, eggshell | Example 8, 1-Base, satin |
| Uncleaned/12" Height | 9.64 | 1.71 | 1.30 |
| Cleaned/12" Height | 0.78 | 0.38 | 0.29 |

From the two scuff marks discovered at the second clothing department store field test, discussed above, the more visible one measured 5.06 CI2000 units before cleaning and 0.26 CIE2000 units after cleaning with common household cleaning product. The paint used in this test was from Example 7, eggshell 1-Base paint. It is noted that the applied forces that made these two scuff marks were unknown, because they were made by the clothing department stores customers during normal routines. Similarly, the applied forces that made the scuff marks 14 in FIGS. 1 and 2 were not measured, but they are forces that are encountered in daily life.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An architectural aqueous coating composition that forms a paint film, said paint film is capable of resisting scuffing or chipping, wherein the architectural aqueous coating composition comprises:
   a wax seeded latex, wherein the wax seeded latex comprises a hydrophobic, wax compound entrapped within a polymeric matrix,
   an optional opacifying pigment,
   a second wax, wherein the second wax makes up from about 0.25 wt. % to about 2.0 wt. % of the architectural aqueous coating composition,
   a coalescent aid, wherein the coalescent aid makes up from about 2.5 wt. % to about 5 wt. % of the architectural aqueous coating composition, and
   a polymeric synthetic pigment.

2. The architectural aqueous coating composition according to claim 1, wherein the second wax makes up less than about 1.75 wt. %.

3. The architectural aqueous coating composition according to claim 2 wherein the second wax makes up less than about 1.25 wt. %.

4. The architectural aqueous coating composition according to claim 3 wherein the second wax makes up less than about 0.5 wt. %.

5. The architectural aqueous coating composition according to claim 1, wherein the coalescent aid makes up at least about 2.8 wt. %.

6. The architectural aqueous coating composition according to claim 5, wherein the coalescent aid makes up at least about 3.0 wt. %.

7. The architectural aqueous coating composition according to claim 6, wherein the coalescent aid makes up at least about 3.5 wt. %.

8. The architectural aqueous coating composition according to claim 1, wherein a range of weight ratios of wax seeded latex to polymeric synthetic pigment is from about 10:1 to about 12:1.

9. The architectural aqueous coating composition according to claim 8, wherein the range of weight ratios of wax seeded latex to coalescent aid is about 14:1 to about 17:1.

10. An architectural aqueous coating composition that forms a paint film, said paint film is capable of resisting scuffing or chipping, wherein the architectural aqueous coating composition comprises:
    a wax seeded latex, wherein the wax seeded latex comprises a hydrophobic, wax compound entrapped within a polymeric matrix,
    an optional opacifying pigment,
    a second wax, wherein the second wax makes up from about 2.0 wt. % to about 12.0 wt. % of the architectural aqueous coating composition, and
    a polyurethane resin, wherein a range of wax seeded latex to polyurethane resin weight ratios is from about 1.0 to about 2.5.

11. The architectural aqueous coating composition according to claim 10, wherein the second wax makes up from about 3.0 wt. % to 10.0 wt. % of the architectural aqueous coating composition.

12. The architectural aqueous coating composition accordingly according to claim 10, wherein the second wax makes up from about 3.0 wt. % to 7.0 wt. % of the architectural aqueous coating composition.

13. The architectural aqueous coating composition accordingly according to claim 10, wherein the range of wax seeded latex to polyurethane resin weight ratios is from about 1.25 to about 2.25.

14. The architectural aqueous coating composition according to claim 1, wherein the wax has an average particle sizes (mV) from about 1 microns (μm) to about 25 μm.

15. The architectural aqueous coating composition according to claim 1, wherein the wax comprises a first wax particle having an average particle size (mV) from about 6 to about 7.5 μm, a second wax particle having an average particle size from about 10 to about 13 μm (mV), and a third wax particle having an average particle size from about 16 to about 19 μm (mV).

16. The architectural aqueous coating composition according to claim 10, wherein the wax comprises a first wax particle having an average particle size (mV) from about 6 to about 7.5 μm, a second wax particle having an average particle size from about 10 to about 13 μm (mV), and a third wax particle having an average particle size from about 16 to about 19 μm (mV).

* * * * *